United States Patent [19]

Kanada

[11] Patent Number: 5,005,098
[45] Date of Patent: Apr. 2, 1991

[54] DISK DRIVE WITH STABILIZER BLOCK FOR INSURING STABLE CONTACT BETWEEN A READ/WRITE HEAD AND A FLEXIBLE RECORDING MEDIUM

[75] Inventor: Tokio Kanada, Tokyo, Japan

[73] Assignee: Sony Corporation, Tokyo, Japan

[21] Appl. No.: 364,121

[22] Filed: Jun. 12, 1989

[30] Foreign Application Priority Data

Jun. 15, 1988 [JP] Japan .................. 63-147101

[51] Int. Cl.⁵ .................. G11B 5/60; G11B 21/21
[52] U.S. Cl. .................. 360/130.34; 360/102
[58] Field of Search ............ 360/102, 130.34

[56] References Cited

U.S. PATENT DOCUMENTS

| | | | |
|---|---|---|---|
| 4,003,091 | 1/1977 | Wright | 360/102 |
| 4,074,330 | 2/1978 | Norton et al. | 360/102 |
| 4,578,727 | 3/1986 | Hills | 360/102 |
| 4,600,955 | 7/1986 | Regruit | 360/99 |
| 4,620,250 | 10/1986 | Hills | 360/102 |

FOREIGN PATENT DOCUMENTS

| | | |
|---|---|---|
| 58-15870 | 3/1983 | Japan . |
| 1112208 | 1/1968 | United Kingdom . |
| 1238607 | 7/1971 | United Kingdom . |
| 1293205 | 10/1972 | United Kingdom . |
| 1432186 | 4/1976 | United Kingdom . |
| 1591276 | 6/1981 | United Kingdom . |
| 2177535 | 2/1987 | United Kingdom . |

*Primary Examiner*—Robert S. Tupper
*Attorney, Agent, or Firm*—Ronald P. Kananen

[57] ABSTRACT

A disk drive unit includes a disk stabilizer block supporting a reading and/or writing head. The disk stabilizer block is formed a surface to sealingly contact with a mating surface of the disk. At least one void is formed on the disk stabilizer block for defining a chamber around the reading and/or writing head, in which Bernoulli drawing force is generated for drawing a flexible storage medium disk. The void reduces contact area between the stabilizer block and the disk for avoiding influence of tolerance in production of the stabilizer block and influence of waving of the disk during rotation.

30 Claims, 5 Drawing Sheets

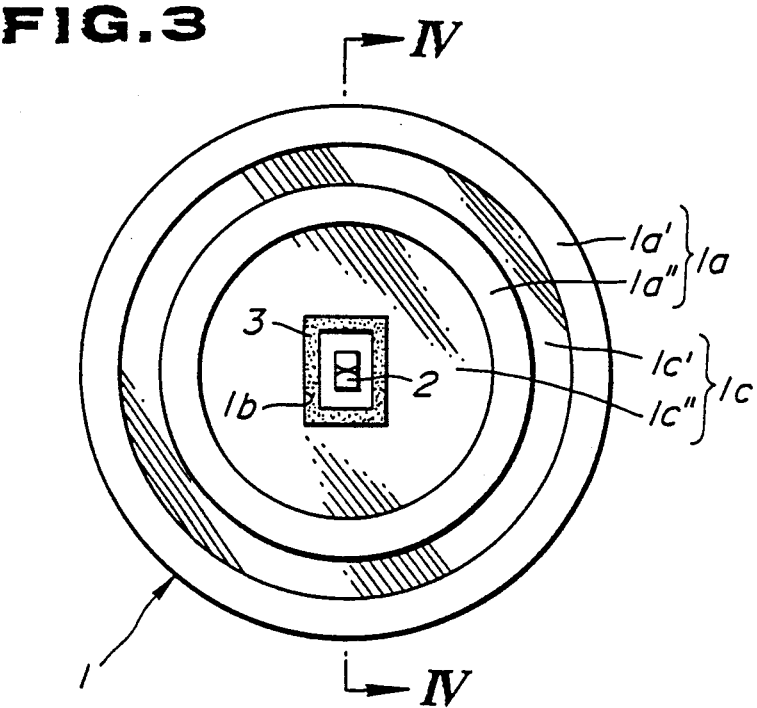
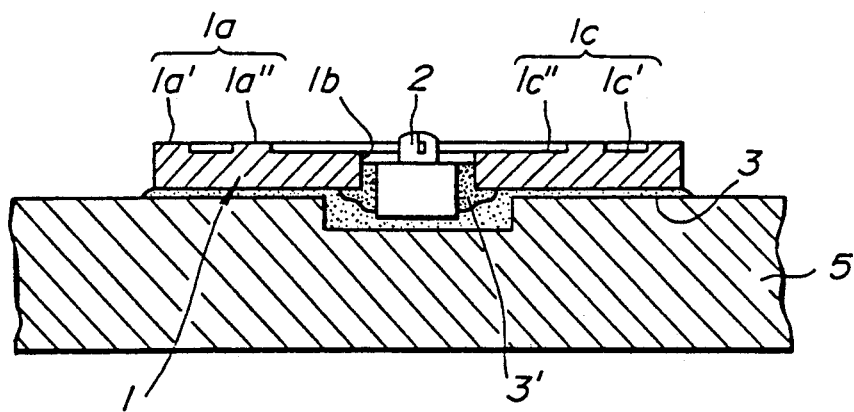

DISK DRIVE WITH STABILIZER BLOCK FOR INSURING STABLE CONTACT BETWEEN A READ/WRITE HEAD AND A FLEXIBLE RECORDING MEDIUM

BACKGROUND OF THE INVENTION

1. Field of the Invention

The present invention relates generally to a disk drive unit for transferring information between a disk and a reading and/or writing head for recording and/or reproducing information. More specifically, the invention relates to a disk drive unit which is suitable for recording and/or reproducing information on a flexible disk. More particularly, the invention relates to a disk drive unit which can establish a stable of relationship between the flexible disk and the reading and/or writing head during recording and/or reproducing information on the disk.

2. Description of the Background Art

U.S. Pat. No. 4,600,955, issued on July 15, 1986 to Curtis R. Regruit and U.S. Pat. No. 4,620,250, issued on Oct. 28, 1986 to Robert G. Hill disclose so-called "contacting" type information transfer technology for recording and/or reproducing information on a flexible magnetic disk. Both of these U.S. patents propose employment of a head-to-disk stablizing unit for stably establishing head-to-disk contact. In the proposed technology, a flexible disk is rotatably housed within a disk cartridge in such a manner that the successive radial portions of the disk move over an opening formed through the disk cartridge. The opening of the disk cartridge is disposed to provide limited radial access to the disk. The head-to-disk stabilizing unit seals the opening to cause formation of a Bernoulli drawing force for forming the successive radial positions of the disk as each portion is passed over the opening. Such drawing force momentarily deflects each portion of the rotating disk toward the opening, causing a deflected portion of the disk to remain substantially in contact with a magnetic recording or reproducing head movable along the opening and thus ensuring stability of the head-to-disk contact.

In order to exert the drawing force, vacuum pressure is generated around the head. The disk is forced toward the head for establishing firm contact with the later so as to enable a steady transfer of information between the head and the disk. Such arrangement for establishing head-to-disk contact is successful to assure head-to-disk contact. However, the magnitude of vacuum pressure to be generated around the head fluctuates. Namely, fluctuation of the vacuum pressure is caused by tolerance in the surface flatness of a stabilizer block which determines the sealing ability. The sealing ability may be influenced not only by surface flatness of the stabilized block but also by waving of the flexible disk during rotation. Due to such fluctuation of magnitude of vacuum generated around the magnetic head, contacting force between the head and the disk can fluctuate to cause variation in information transfer performance.

SUMMARY OF THE INVENTION

Therefore, it is an object of the present invention to provide a disk drive unit which can unify a force for establishing head-to-disk contact for steady transfer of information between a flexible disk and a reading and/or writing head.

Another object of the invention is to provide a disk drive unit incorporating means for controlling vacuum pressure generated around the head for establishing head-to-disk contact with a contact force for achieving stability of head-to-disk contact and constant performance of information transfer between the head and the disk.

In order to accomplish the aforementioned and other objects, a disk drive unit, according to the present invention, includes a disk stabilizer block supporting a reading and/or writing head. The disk stabilizer block is formed with a surface to sealingly contact with a mating surface of the disk. At least one void is formed on the disk stabilizer block for defining a chamber around the reading and/or writing head, in which a Bernoulli drawing force is generated for drawing a portion of a flexible storage medium disk. The void reduces the contact area between the stabilizer block and the disk for avoiding an influence of a tolerance in production of the stabilizer block and an influence caused by waving of the disk during rotation.

According to one aspect of the invention, a stabilizer block structure for a contact-type disk drive unit, in which information to be recorded and/or reproduced is transferred between a storage medium disk and a reading and/or writing head being held in contact with each other, the stabilizer block comprises:

- a stabilizer block body defining a head receptacle opening for securing the reading and/or writing head therein;
- a contact surface incorporated with the stabilizer block body and oriented on one side of the stabilizer block body, for defining a contact area for establishing contact with the flexible storage medium disk; and
- at least one void formed on the one side of the stabilizer block body and surrounding the reading and/or writing head for defining a vacuum chamber in cooperation with the flexible storage medium disk for generating a Bernoulli drawing force for drawing the flexible storage medium disk to establish steady head-to-disk contact while the flexible storage medium disk is rotatingly driven.

According to another aspect of the invention, a disk drive unit for transferring information between a flexible storage medium disk and a reading and/or writing head, comprises:

- a disk drive means for rotatingly driving the flexible storage medium disk;
- a carriage means for carrying the reading and/or writing head in a radial direction of the flexible storage medium disk for accessing recording tracks; and
- a stabilizer block supporting the reading and/or writing head and mounted on the carriage means to be radially shifted therewith, the stabilizer block including means for defining a limited area of contact surface to contact with the flexible storage medium disk, and a chamber having a surface oriented away from the mating surface of the flexible storage medium disk for generating a drawing force therein for drawing the flexible storage medium disk onto the reading and/or writing head while the flexible storage medium disk is rotatingly driven for steady transfer of information between the flexible storage medium disk and the reading and/or writing head.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 3 is a plan view of the first embodiment of an assembly of a recording and/or writing head and a disk stabilizer block employed in the preferred embodiment of the disk drive unit according to the present invention;

FIG. 4 is a section taken along line IV—IV of FIG. 3;

DESCRIPTION OF THE PREFERRED EMBODIMENT

Figure 1:
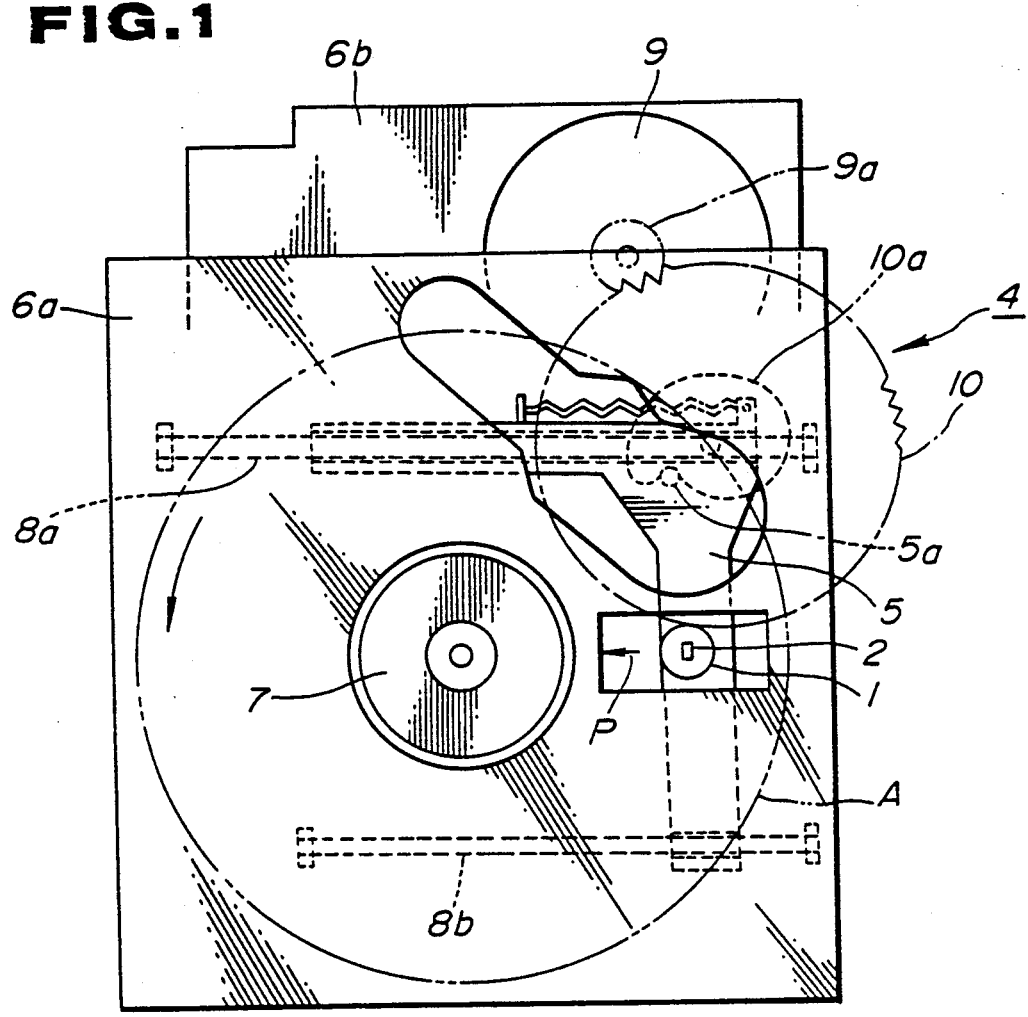
FIG. 1 is a fragmentary illustration of the preferred embodiment of a disk drive unit according to the present invention.
Figure 2:
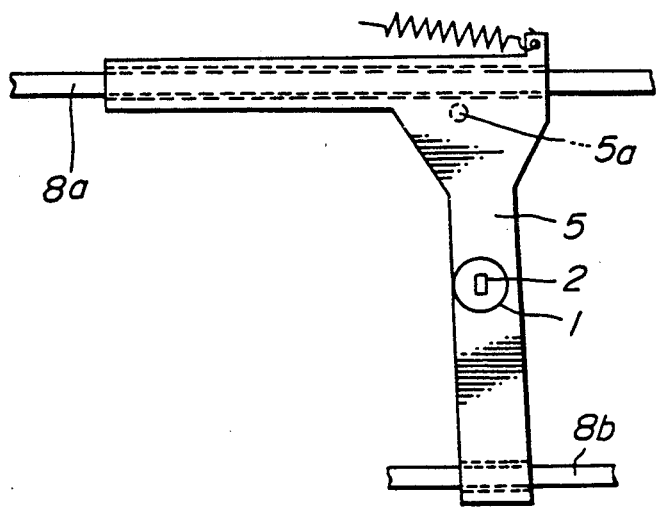
FIG. 2 is a fragmentary illustration of a head carriage employed in the preferred embodiment of the disk drive unit according to the invention.

Referring now to the drawings, particularly to FIGS. 1 and 2, the preferred embodiment of a disk drive unit 4, according to the present invention, is specifically designed to be employed in an electronic still camera which records and/or reproduces video and/or audio signals on a flexible magnetic disk A as an information storage medium. As is known in the art, the magnetic disk to be used for the electronic camera is formed with a predetermined number of circumferentially and coaxially extending recording tracks. Each recording track is adapted to record one field of a video signal or a predetermined period of an audio signal. In the known art, the audio signal is recorded on the relevant recording track in a time-axis compressed fashion. As will be appreciated, the disk A may be housed within a cartridge casing for forming a disk cartridge. The disk cartridge is formed with a disk access opening P, through which the magnetic disk A can be accessed while it is rotatingly driven on a turn table 7 associated with a spindle motor. The disk access opening P extends radially over the recording tracks formed on the disk A.

A magnetic head assembly including a magnetic head 2 and a stabilizer block 1 supporting the head. The magnetic head assembly is mounted on a movable carriage 5. As seen from FIG. 2, the carriage 5 is formed into essentially L-shaped configuration having a radially extending section extending in parallel to the shifting direction of the head assembly and a transversely extending section extending transversely to the radially extending section. The radially extending section of the carriage 5 slidably engages with a guide rail 8a mounted on an upper chassis 6a. On the other hand, the end of the transverse section remote from the radially extending section also engages with a guide rail 8b mounted on the upper chassis 6a. The guide rails 8a and 8b extend in radial directions and in parallel relationship to each other. Therefore, the carriage 5 slidingly shifts along these guide rails 8a and 8b in order to place the head assembly at the desired radial position for accessing a desired recording track on the disk A.

The carriage 5 is associated with a driving mechanism for radially shifting along the guide rails 8a and 8b. The driving mechanism comprises an electric motor 9 which has a driving shaft driving a smaller diameter gear 9a. The smaller diameter gear 9a engages with a larger diameter gear 10. The larger diameter gear 10 is thus driven by the driving torque transmitted through the smaller diameter gear 9a. The larger diameter gear 10 carries a cam member 10a which is associated with the former for rotation therewith. The cam member 10a engages with the an essentially pin-shaped cam follower 5a which extends from the carriage 5. The driving mechanism thus constructed drives the carriage 5 with the head assembly over the recording tracks on the disk A so that the magnetic head 2 can access the appropriate recording track via the disk access opening P of the cartridge casing.

FIGS. 3 and 4 show the first embodiment of the head assembly comprising the magnetic head 2 and the stabilizer block 1. The stabilizer block 1 is formed into an essentially disc-shaped configuration and made of a metallic material. The disc-shaped stabilizer block 1 is bonded on the carriage 5 by adhesive 3 at one axial end. As seen from FIG. 3, the magnetic head 2 is oriented at the center of the stabilizer block 1 and slightly extends from the other axial end of the stabilizer block. The stabilizer block 1 is formed with an essentially rectangular head receptacle opening 1b at the center thereof. The magnetic head 2 is received within this head receptacle opening 1b and secured therein by means of an adhesive 3. The axial end of the stabilizer block 1 from which the magnetic head 2 extends, mates with the flexible disk A, which axial end will be hereafter referred to as a "disk mating end". The disk mating end of the stabilizer block 1 has circumferentially extending and mutually coaxial annular projections 1a' and 1a". The inner annular projection 1a" has a substantially flat surface to mate with the flexible magnetic disk A and defines a recess 1c" surrounding the head 2. The outer annular projection 1a' also has a substantially flat surface to mate with the disk A. The surfaces of the inner and outer annular projections 1a" and 1a' are axially oriented on the common plane. An annular groove 1c' is also defined between the inner and outer annular projections 1a" and 1a'. The recess 1c" and the groove 1c' serves for defining vacuum chambers for generating vacuum pressure therein while the disk A is rotatingly driven at high speed.

It should be appreciated that, in the practical projection of the head assembly, the recess 1c" and the groove 1c' may be formed by spot facing.

The width and depth of the recess $1c''$ and the groove $1c'$ are experimentally determined so as to appropriately adjust vacuum pressure as a Bernoulli pull down force to be exerted on the flexible magnetic disk A. In the shown embodiment, the depth of the recess $1c''$ and the groove $1c'$ is preferably in a range of 50 μm to 20 μm.

During an information recording or reproducing operation, the flexible magnetic disk A is driven to rotate with the turn table 7 by means of the spindle motor. By high speed rotation of the disk, air flow is generated to cause vacuum pressure in the recess $1c''$ and the groove $1c'$ which define enclosed and sealed chambers in cooperation with the disk A which contacts with the surfaces of the inner and outer annular projections $1a''$ and $1a'$. By the vacuum pressure generated in the recess $1c''$ and the groove $1c'$, the flexible magnetic disk A is drawn toward the stabilizer block 1 so as to establish firm contact with the magnetic head 2 for steady transfer of information therebetween.

At this time, since the areas to generate the vacuum pressure are specified by the presence of the recess $1c''$ and the groove $1c'$ and the stabilizer block 1 has no contact surface to contact with the disk in the vicinity of the magnetic head, the magnitude of vacuum pressure as the drawing force becomes substantial corresponds to the rotational speed of the disk irrespective of the waving of the disk or so forth which otherwise cause fluctuation of the magnitude of vacuum pressure to be generated. Stability of the vacuum pressure to be generated in the recess $1c''$ and the groove $1c'$ makes it possible to steadily establish a head-to-disk contact with contact force.

Furthermore, because the surface of the stabilizer block to contact with the flexible magnetic disk is substantially limited due to a presence of the recess and groove, the requirement for accuracy of surfacing can he lowered to make projection of the stabilizer block easier. This helps for lowering of the production cost.

Figure 5:
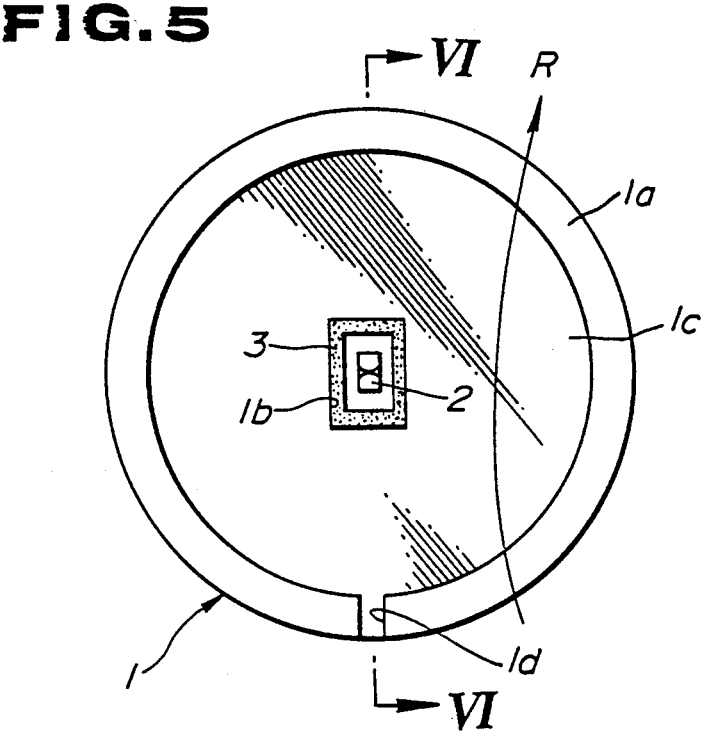
FIG. 5 is a plan view of the second embodiment of an assembly of a recording and/or writing head and a disk stabilizer block, according to the present invention.
Figure 6:
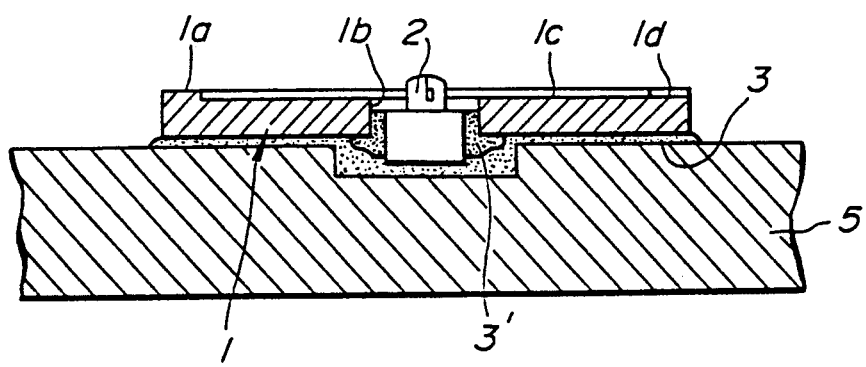
FIG. 6 is a section taken along line VI—VI of FIG. 5.

FIGS. 5 and 6 show the second embodiment of the head assembly according to the present invention. In this embodiment, a single circular recess $1c$ and a circumferentially extending annular projection $1a$. The annular projection $1a$ extends along the circumferential edge of the stabilizer block 1 for defining the recess $1c$ inside thereof and surrounding the head 2. A radially extending groove $1d$ is formed through the annular projection $1a$ for establishing communication between the recess $1c$ and the ambient. The radially extending groove $1d$ is oriented at a downstream side relative to the rotating direction of the flexible magnetic disk as indicated by an arrow R.

Figure 7:
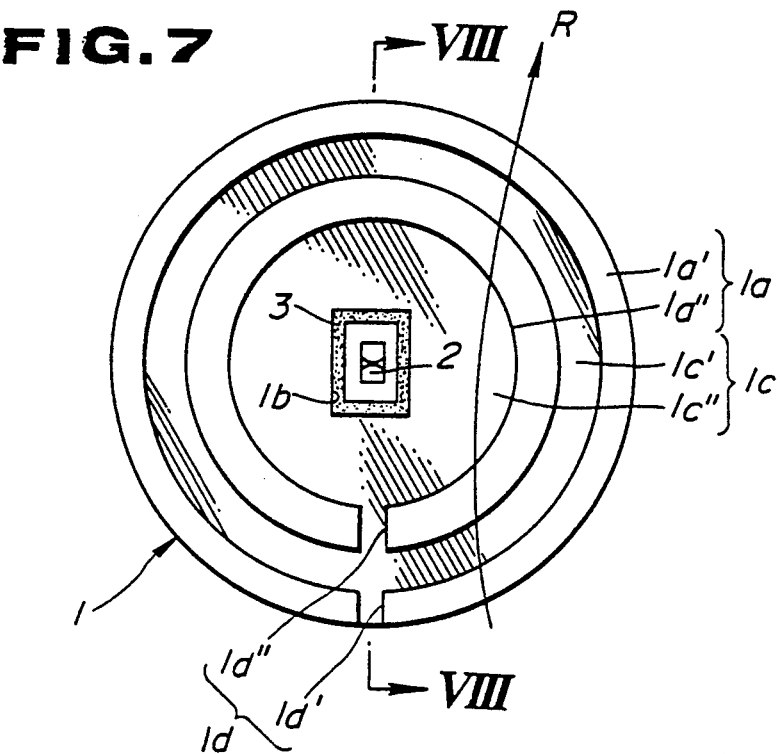
FIG. 7 is a plan view of the third embodiment of an assembly of a recording and/or writing head and a disk stabilizer block, according to the present invention.
Figure 8:
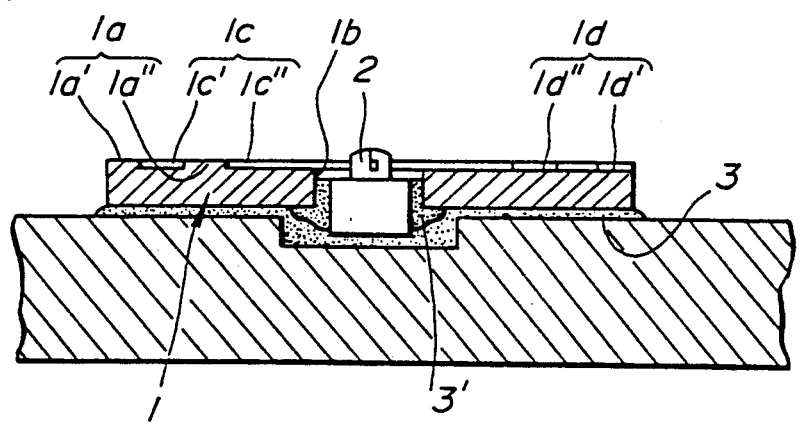
FIG. 8 is a section taken along line VIII—VIII of FIG. 7.

FIGS. 7 and 8 show the third embodiment of the head assembly to be employed in the preferred embodiment of the disk drive unit according to the present invention. As can be seen from FIGS. 5 and 6, the shown embodiment has essentially the same construction as that of the first embodiment set forth above, except for the radially extending grooves $1d''$ and $1d'$. The radially extending grooves $1d''$ and $1d'$ serve for establishing communication between the recess $1c''$, the groove $1c'$ and ambient.

In the second and third embodiments set forth above, vacuum pressure is generated in the recess $1c$ and $1c''$ and the groove $1c'$ in the same manner as set out with respect to the first embodiment while the disk is driven to rotate at high speed. Since the radially extending grooves $1d$, $1d''$ and $1d'$ are formed at the downstream side relative to the rotational direction of the disk, the presence of these radially extending grooves may not affect generation of the vacuum pressure. On the other hand, the radially extending grooves $1d$, $1d''$ and $1d'$ serve for introducing ambient air in aid of the pressure difference, to raise pressure in the recess and the groove for quickly releasing the drawing force exerted on the flexible magnetic disk when the rotational speed of the disk is decelerated to stop. Quick releasing of the drawing force upon stopping of the disk is advantageous for reducing load on the motor 9 for radially shifting the head assembly and on the spindle motor for starting rotation of the disk.

Figure 9:
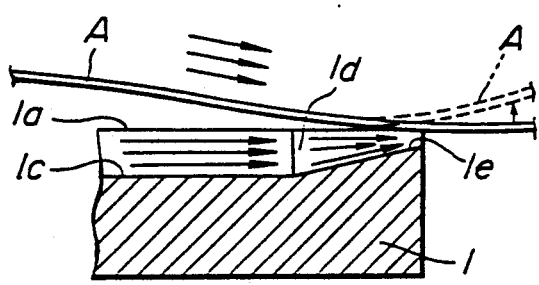
FIGS. 9 and 10 are enlarged sections of the circumferential edge portion of the stabilizer block to be employed in respective embodiments of the assembly of FIGS. 3 through 8.

In the second and third embodiments set forth above, the circumferential edge portion of the radially extending groove $1d$ and $1d'$ tolerates to narrow the end exposed to the ambient when the bottom $1e$ raises as shown in FIG. 9. In such case, air flow from the inside of the recess $1c$ to the ambient is generated to raise the pressure at the narrowed end and possibly to generate dynamic pressure. This clearly reduces magnitude of vacuum pressure to reduce the drawing force to draw the flexible magnetic disk A onto the contact surface of the annular projection or projections. This may cause releasing of the disk from the contacting surface of the annular projections as shown by the broken line in FIG. 9. This clearly makes the head-to-disk contact unstable.

Figure 10:
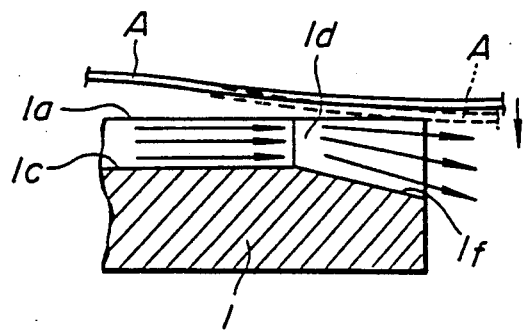

In view of this, improvement of the configuration of the radially extending groove $1d$ and $1d'$ is proposed in FIG. 10. As can be seen from FIG. 10, the bottom $1f$ of the radially extending groove $1d$ is declined toward the circumferential edge of the stabilizer block 1. This provides a wider air flow path area at the radially outer end of the radially extending groove $1d$ than that at the radially inner end thereof. This increases the vacuum pressure to be generated at the radially outer end portion of the radially extending groove $1d$ while the disk is driven to rotate. Greater vacuum generated in the radially outer end portion of the radially extending groove $1d$ assures drawing of the flexible magnetic disk A onto the contact surface of the annular projection. Therefore, with this improvement, further stable head-to-disk contact can be established.

Figure 11:
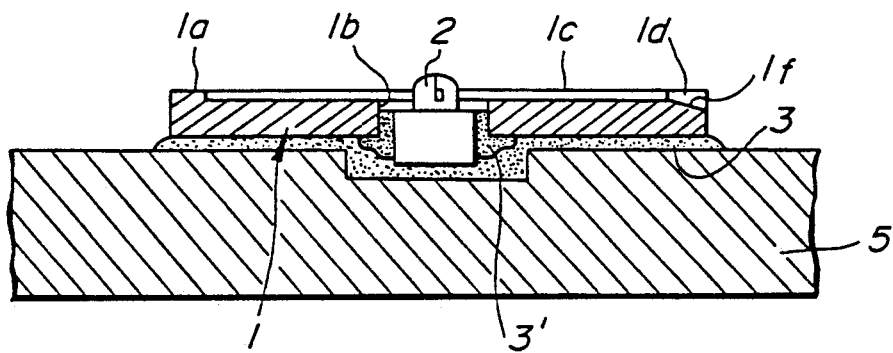
FIG. 11 is a section of the fourth embodiment of an assembly of a recording and/or writing head and a disk stabilizer block employed in the preferred embodiment of the disk drive unit according to the present invention.
Figure 12:
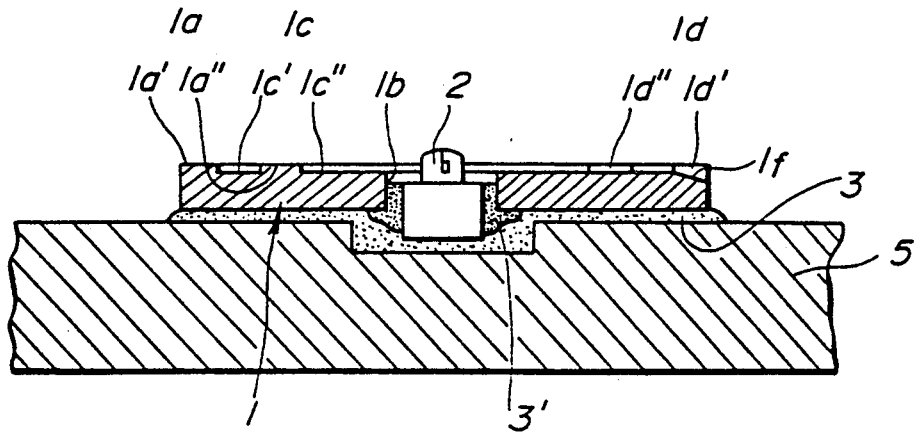
FIG. 12 is a section of the fifth embodiment of an assembly of a recording and/or writing head and a disk stabilizer block employed in the preferred embodiment of the disk drive unit according to the present invention.

FIGS. 11 and 12 respectively show the fourth and fifth embodiments as respective modifications of the second and third embodiments of the head assembly as set forth above. As can be seen from these figures, both of the fourth and fifth embodiments of FIGS. 11 and 12 employ the radially extending groove $1d$ and $1d'$ as illustrated in FIG. 10. Therefore, these embodiments will provide higher stability for head-to-disk contact for further stable information transfer operation between the head and disk.

While the present invention has been disclosed in terms of the preferred embodiment in order to facilitate a better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment is specifically directed to the electronic still camera technology to be employed, the technology herewith disclosed may be applicable for any contact type data transfer technology between the flexible storage medium disk and the reading and/or writing head. Furthermore, though the specific construction for the disk drive unit including the head shifting mechanism has been disclosed in terms of the preferred embodiment of the invention, the construction of the head shifting mechanism per se is not essential to the present invention and can be replaced with any appropriate constructions. For example, the construction of the head shifting mechanism employed in the aforementioned U.S. Pat. Nos. 4,602,250 and 4,600,955 may be employed to implement the present invention.

What is claimed is:

1. A stabilizer block structure for a contact-type disk drive unit, in which information to be recorded and/or reproduced is transferred between a flexible storage medium disk and a reading and/or writing head being held in contact with each other, said stabilizer block structure comprising:
    a stabilizer block body defining a head receptacle opening for securing said reading and/or writing head therein;
    a contact surface incorporated with said stabilized block body and oriented on one side of said stabilizer block body, for defining a contact area for establishing contact with said flexible storage medium disk, the surface area of said contact area being less than a surface area of said one side of said stabilizer block body; and
    at least one void formed on said one side of said stabilizer block body, said void being substantially surrounded by said contact area and said void surrounding said reading and/or writing head for defining a vacuum chamber in cooperation with said flexible storage medium disk for generating a Bernoulli drawing force for drawing said flexible storage medium disk to establish steady head-to-disk contact while said flexible storage medium disk is rotatingly driven.

2. A stabilizer block structure as set forth in claim 1, wherein said void is defined by a bottomed recess formed around said reading and/or writing head.

3. A stabilizer block structure as set forth in claim 1, wherein said void is defined by a bottomed recess formed around said reading and/or writing head and a bottomed annular groove formed around said recess.

4. A stabilizer block structure as set forth in claim 2, wherein said void is further defined by a radially extending groove establishing communication between the inside and outside of said recess.

5. A stabilizer block structure as set forth in claim 3, wherein said void further comprises a radially extending groove having outer end exposed to the ambient for establishing communication between inside and outside of said void.

6. A stabilizer block structure as set forth in claim 1, wherein said void is provided with a predetermined depth in a range of 50 $\mu$m to 20 $\mu$m.

7. A stabilizer block structure as set forth in claim 3, wherein said recess and said groove are each provided with a substantially equal depth.

8. A stabilizer block structure as set forth in claim 7, wherein the depth of said recess and groove is in a range of 50 $\mu$m to 20 $\mu$m.

9. A stabilizer block structure as set forth in claim 4, wherein said radially extending groove has a bottom declining toward the outer end.

10. A stabilizer block structure as set forth in claim 5, wherein said radially extending groove has a bottom declining toward the outer end.

11. A disk drive unit for transferring information between a flexible storage medium disk and a reading and/or writing head, comprising:
    a disk drive means for rotatingly driving said flexible storage medium disk;
    a carriage means for carrying said reading and/or writing head in a radial direction of said flexible storage medium disk for accessing recording tracks;
    a stabilizer block supporting said reading and/or writing head and mounted on said carriage means to be shifted radially therewith, said stabilizer block including an essentially annular contact surface incorporated with said stabilizer block body, extending in a circumferential direction and oriented on one side of said stabilizer block body, for defining a limited area of contact surface to contact with said flexible storage medium disk, at least one void formed on said one end of said stabilizer block body for defining a chamber having a surface oriented away from the mating surface of said flexible storage medium disk for generating a Bernoulli drawing force for drawing said flexible storage medium disk to establish steady head-to-disk contact while said flexible storage medium disk is rotatingly driven.

12. A disk drive unit as set forth in claim 11, wherein said chamber is formed into an essentially circular configuration centered at said reading and/or writing head.

13. A disk drive unit as forth in claim 12, wherein said chamber is separated into a first circular section oriented around said reading and/or writing head and a second annular section oriented around said first circular section and separated from said first circular section by an annular projection formed therebetween.

14. A disk drive unit as set forth in claim 13, wherein said annular projection is provided with a surface mating with said flexible storage medium disk, which surface lies flush with said contacting surface.

15. A disk drive unit as set forth in claim 11, wherein said chamber is exposed to ambient through a radially extending groove.

16. A stabilizer block structure as set forth in claim 11, wherein said chamber is provided a predetermined depth in a range of 50 $\mu$m to 20 $\mu$m.

17. A stabilizer block structure as set forth in claim 15, wherein said radially extending groove has a bottom declining toward the outer end.

18. A stabilizer block structure for a contact-type disk drive unit, in which information to be recorded and/or reproduced is transferred between a storage medium disk and a reading and/or writing head being held in contact with each other, said stabilizer block comprising:
    a stabilizer block body defining a head receptacle opening for securing said reading and/or writing head therein;
    a contact surface incorporated with said stabilizer block body and oriented on one side of said stabilizer block body, for defining a contact area for establishing contact with said flexible storage medium disk, the surface area of said contact area being less than a surface area of said one side of said stabilizer block body; and
    at least one void formed on said one side of said stabilizer block body, said void being substantially surrounded by said contact area and said void further comprising a radially extending groove having an outer end exposed to the ambient for establishing communication between inside and outside of said void, said void further surrounding said reading and/or writing head for defining a vacuum chamber in cooperation with said flexible storage medium disk for generating a Bernoulli drawing force for drawing said flexible storage medium disk to establish steady head-to-disk contact while said flexible storage medium disk is rotatingly driven.

19. A stabilizer block as set forth in claim 18, wherein said void is provided with a predetermined depth in a range of 50 μm to 20 μm.

20. A stabilizer block structure as set forth in claim 18, wherein said recess and said groove are each provided with a substantially equal depth.

21. A stabilizer block structure as set forth in claim 20, wherein the depth of said recess and groove is in a range of 50 μm to 20 μm.

22. A stabilizer block structure as set forth in claim 18, wherein said radially extending groove has a bottom declining toward the outer end.

23. A disk drive unit for transferring information between a flexible storage medium disk and a reading and/or writing head, comprising:
   a disk drive means for rotatingly driving said flexible storage medium disk;
   a carriage means for carrying said reading and/or writing head in a radial direction of said flexible storage medium disk for accessing recording tracks;
   a stabilizer block supporting said reading and/or writing head and mounted on said carriage means to be shifted radially therewith, said stabilizer block including means for defining a limited area of contact surface to contact with said flexible storage medium disk, a chamber having a surface oriented away from the mating surface of said flexible storage medium disk, said chamber being separated into a first circular section oriented around said reading and/or writing head and a second annular section oriented around said first circular section and separated from said first circular section by an annular projection formed therebetween for generating a Bernoulli drawing force for drawing said flexible storage medium disk to establish steady head-to-disk contact while said flexible storage medium disk is rotatingly driven.

24. A disk drive unit as set forth in claim 23, wherein said chamber is formed into an essentially circular configuration centered at said reading and/or writing head.

25. A disk drive unit as set forth in claim 23, wherein said annular projection is provided with a surface mating with said flexible storage medium disk, which surface lies flush with said contacting surface.

26. A disk drive unit as set forth in claim 23, wherein said chamber is exposed through a radially extending groove.

27. A disk drive unit as set forth in claim 23, wherein said void in said stabilizer block is provided a predetermined depth in a range of 50 μm to 20 μm.

28. A disk drive unit as set forth in claim 26, wherein said stabilizer block recess and groove are each provided with a substantially equal depth.

29. A disk drive unit as set forth in claim 26, wherein the depth of said recess and groove of said stabilizer block is in a range of 50 μm to 20 μm.

30. A disk drive unit as set forth in claim 26, wherein said radially extending groove has a bottom declining toward the outer end.

* * * * *